United States Patent [19]
Dahanayake et al.

[11] Patent Number: 5,919,980
[45] Date of Patent: *Jul. 6, 1999

[54] RECOVERY AND REUSE OF AMPHOTERIC SURFACTANTS FROM AQUEOUS SOLUTIONS

[75] Inventors: Manilal S. Dahanayake, Princeton Junction, N.J.; Yun Brian Yang, Wilton, Conn.; Mark E. Ventura, Freehold, N.J.

[73] Assignee: Rhodia Inc., Cranbury, N.J.

[*] Notice: This patent is subject to a terminal disclaimer.

[21] Appl. No.: 08/812,901

[22] Filed: Mar. 10, 1997

Related U.S. Application Data

[63] Continuation-in-part of application No. 08/445,244, May 19, 1995, Pat. No. 5,654,480.

[51] Int. Cl.⁶ .................................................. C07C 213/06
[52] U.S. Cl. ........................ 564/292; 564/296; 210/651
[58] Field of Search ........................... 564/292; 566/296; 210/651

[56] References Cited

U.S. PATENT DOCUMENTS

| | | | |
|---|---|---|---|
| 3,625,782 | 12/1971 | Oberth et al. | 149/19 |
| 4,111,812 | 9/1978 | Baddour | 210/257 |
| 4,430,171 | 2/1984 | Lemke et al. | 204/43 T |
| 4,846,976 | 7/1989 | Ford | 210/636 |
| 4,891,159 | 1/1990 | Nadolsky | 252/545 |
| 4,892,660 | 1/1990 | Sweet | 210/637 |
| 5,026,891 | 6/1991 | Colas et al. | 556/413 |
| 5,049,282 | 9/1991 | Linder et al. | 210/651 |
| 5,205,937 | 4/1993 | Bhave et al. | 210/651 |
| 5,207,917 | 5/1993 | Weaver | 210/651 |
| 5,232,460 | 8/1993 | Botz | 8/141 |
| 5,259,960 | 11/1993 | Beck et al. | 210/638 |
| 5,324,425 | 6/1994 | Ellison | 210/167 |
| 5,326,906 | 7/1994 | Tetzlaff et al. | 562/11 |
| 5,348,588 | 9/1994 | Winston | 134/10 |
| 5,352,363 | 10/1994 | Shibano | 210/651 |
| 5,401,571 | 3/1995 | Shiraki et al. | 428/336 |
| 5,654,480 | 8/1997 | Dahanayake et al. | 564/292 |

OTHER PUBLICATIONS

Ang, Ground Water Monit. Rem. 14, 3 160–71 (1994).
Chem. Abs. 122:113877 X (1994) Ang.

Primary Examiner—Gary Geist
Assistant Examiner—Sreeni Padmanabhan
Attorney, Agent, or Firm—Craig M. Bell; John Daniel Wood

[57] ABSTRACT

Improved surfactant recovery for recycle and reuse upon ultrafiltration of a surfactant-containing aqueous solution can be obtained using a betaine or amide oxide amphoteric surfactant in the aqueous cleaner/contaminant solution. The surfactant passes through the ultrafiltration membrane with the water in the permeate in very high amounts while the contaminants and other undesirable components are held back in the retentate.

31 Claims, No Drawings

RECOVERY AND REUSE OF AMPHOTERIC SURFACTANTS FROM AQUEOUS SOLUTIONS

RELATED APPLICATION DATA

This application is a continuation-in-part of U.S. Ser. No. 08/445,244 filed May 19, 1995, now U.S. Pat. No. 5,654,480.

BACKGROUND OF THE INVENTION

This invention relates to unexpected discovery of surfactants which demonstrate improved surfactant recovery from aqueous solution upon ultrafiltration.

Because of environmental and economic concerns, it is important to remove and, desirably, recover for reuse active ingredients from aqueous by-product or waste solutions. Recovery and recycling not only reduces or eliminates the discharge of contaminated water into the environment but can also reduce the overall cost of industrial processes. This is of particular importance in processing aqueous solutions containing surfactants as they can be a costly component of the solution.

Ultrafiltration equipment can be used to overcome certain waste disposal problems in connection with aqueous solutions, whether using polymeric or sintered metal/sintered metal oxide filters. The economics of these processes in recovering surfactants have been seriously hampered since many of the conventional surfactants are not recovered in the permeate. The ability to recycle and reuse surfactants recovered from aqueous solutions can be significantly reduced thereby necessitating back addition of surfactant to bring the surfactant in solution to the original level. This is a significant problem in the area of recycling as full economics cannot be achieved.

Systems have been disclosed that claim significant recovery of water-based cleaning systems in the permeate upon ultrafiltration of waste though expressions of dissatisfaction have been heard concerning the filterability and recovery of existing water-based cleaning formulations. Whereas U.S. Pat. No. 5,205,937 to Bhave et. al. asserts to disclose aqueous cleaning systems wherein high percentages of the cleaner passes through the filter in the permeate for recycling, the amount of cleaner in the permeate is measured by HCl titration which is a measure of the caustic or sodium hydroxide present, not the surfactant. Most of the nonionic surfactants disclosed therein do not in fact pass through the membrane.

It is known that certain sultaine surfactants as disclosed in U.S. Pat. No. 4,891,159 provide effective surfactant properties in highly alkaline cleaning solutions making them useful in paint stripping compositions, hard surface cleaners, oven cleaners, wax strippers, degreasers, aluminum cleaners, bottle washing compositions and at lower alkalinity, laundry and dish washing detergents and hand cleansers. However, these surfactants are not taught to provide any significant benefits when used in connection with an ultrafiltration based surfactant separation and recovery system.

The present invention is directed to the finding that surfactant-containing aqueous compositions containing a certain group of amphoteric surfactants unexpectedly provide improved surfactant recovery in the permeate after ultrafiltration. More particularly, it is discovered that a certain class of betaine and amide oxide amphoteric surfactants provide superior surface activity in aqueous cleaner systems while at the same time pass through the filtration membranes for efficient recycling capabilities.

SUMMARY OF THE INVENTION

It has unexpectedly been found that increased surfactant recovery can be obtained upon ultrafiltration by the use of aqueous solutions containing amphoteric surfactants which when ultrafiltered forms a permeate of surfactant characterized by increased surfactant recovery in the permeate. More specifically, the present invention relates to a process for the recovery of high yields of amphoteric surfactants from the permeate of a recyclable cleaning system wherein said amphoteric surfactant is selected from the group consisting of betaines and amine oxide compositions.

The present invention also provides a process for the filtration of contaminants from an aqueous surfactant-containing solution by passing a feed solution and contaminants through an ultrafiltration membrane, preferably a metal oxide membrane on a ceramic support.

In another aspect, the present invention relates to a process for separating a surfactant in an aqueous solution containing contaminants, e.g., such as oils, greases, waxes, emulsified lubricants, by passing the solution cross-flow through a multichannel sintered monolithic metal/metal oxide ultrafiltration membrane on a ceramic support to form a permeate surfactant recovery. The sintered metal oxide membrane has a nominal pore size in the range of about 50 to 1000 Angstroms.

DETAILED DESCRIPTION OF THE INVENTION

The present invention provides an efficient and effective composition and process for separating surfactants from aqueous solutions for recycling and reuse. It has unexpectedly been found that the compositions of the invention containing the surfactants to be described hereinafter are adapted for substantial recovery upon ultrafiltration. The surfactants which have been found to provide the benefits of the invention can be represented by the formulae:

I.
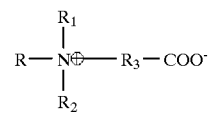

II.
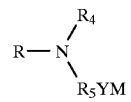

III.
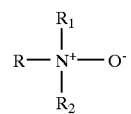

and mixtures thereof and mixtures with other surfactants wherein R is selected from the group of alkyl, alkylarylalkyl, arylalkyl, alkylaminoalkyl, alkylamidoalkyl, or alkoxylalkyl, and the hydroxy substituted derivatives thereof wherein the alkyl group contains from about 1 to about 22 carbon atoms, the aryl group is up to and including two fused rings and the alkoxy group contains from 4 to 18, preferably 4 to 10, carbon atoms wherein the total carbon atom content of the R group is no more than about 22 carbon atoms. R can be butyl, hexyl, 2- ethylhexyl, octyl, capryl, caprylyl, coco, tallow and the like. Substituents from natural sources contain mixed carbon chain lengths or can be purified to reduce the number of chain lengths in the alkyl groups. R can also be alkylamidoalkyl, such as butylamidoethyl or caprylamidopropyl, cocoamidopropyl and alkoxyalkyl such as cocooxypropyl, decyloxypropyl, hexyloxymethyl or hexyloxy -2- hydroxy-propyl. R can also be $R_1$ and $R_2$ independently represent alkyl chains of from about 1 to about 6 carbon atoms, preferably methyl, and the hydroxy substituted derivatives thereof or hydroxy polyoxyethylene, polyoxypropylene or mixed polyether polymers of EO and PO having no more than 20 ether linkages; or $R_1$ and $R_2$ may jointly be —$CH_2CH_2OCH_2CH_2$— or —$CH_2CH_2SCH_2CH_2$— so as to form together with the nitrogen atom a morpholine or thiomorpholine ring. $R_3$ represents an alkyl or hydroxy substituted alkyl group of from 1 to about 4 carbon atoms; $R_4$ represents $R_6OH$, $R_5YM$, preferably $R_5COOM$, or hydrogen where $R_6$ is lower alkyl of from 1 to about 4, preferably 2, carbon atoms and the hydroxy substituted derivatives thereof; $R_5$ represents alkyl or hydroxy substituted alkyl of from 1 to about 4, preferably 1 or 2, carbon atoms with the further caveat that $R_5$ YM can be:

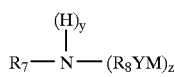

wherein $R_7$ and $R_8$ represent $C_1$–$C_4$ alkyl and y is 0 or 1, Z is 1 or 2 with the stipulation that y+z=2. Y represents $COO^-$, M represents hydrogen and or an alkali metal such as sodium or potassium.

Preferably, the surfactants are low or non-foaming as foaming creates difficulties in filtering. The compounds of Formula I are generally defined as betaines are well known compounds and can be made by well known methods. Betaine is trimethyl glycine. Replacing one of the methyl groups provides a betaine derivative, commonly an alkyl betaine. Betaines are zwitterionic and internally compensated salts. The remaining two methyl groups can be replaced such as with hydroxyethyl groups to form dihydroxyethyl alkyl glycinate.

In betaines, R is $C_4$ to $C_{22}$ alkyl, alkylamidoalkyl or alkoxyalkyl. The alkyl group or portion of the group is preferably about $C_4$ to about $C_{10}$. $R_1$ and $R_2$ are preferably methyl. When $R_1$ and $R_2$ are not methyl, they can be a substituted alkyl with an electron withdrawing group such as —OH, —SH, —$CH_3O$ or —$CH_3S$.

Betaine amphoteric surfactants of particular value in the practice of the present invention are compounds represented by the following formula:

IV.
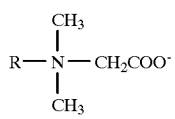

V.
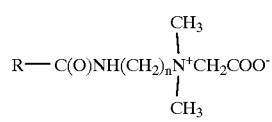

-continued

VI.
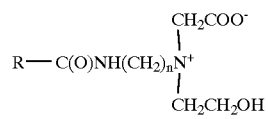

VII.
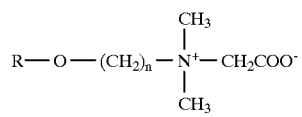

wherein R has been hereinbefore defined and n is an integer of from about 2–20. Two other specific amphoteric species include the following structures.

XI.
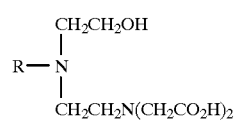

IX.
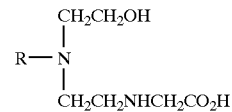

wherein R has been previously defined herein

Materials which employ an oxygen radical in place of the carboxyl group, by analogy, are described as amine oxides. These are well known compositions.

A specific group of amide oxides that have also been found to be effective in the invention can be depicted by the following formulae:

XI.
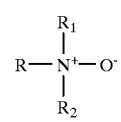

XII.
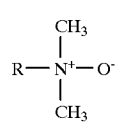

wherein R independently represents alkyl, aryl, or alkylaryl groups of from about 4 to about 18 carbon atoms or alkoxymethylene wherein the alkoxy group contains from about 4 to about 8 carbon atoms. Suitable amine oxide amphoteric surfactants useful in the process of the present invention include dihydroxyethyl cocomine oxide, dihydroxy tallowamine oxide, dimethyl cocoalkylamine oxide, dimethyl hexadecylamine oxide, cocomine oxide, lauryl oxypropyl dimethyl amine oxide, palmitamine oxide, hydrogenated tallowamine oxide and mixtures thereof.

Specific amine oxide compounds of this class which can be used in the invention include the following which are of the formulae:

XI. 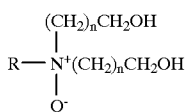

XII. 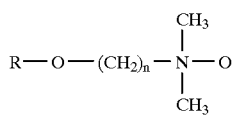

wherein R has been hereinbefore defined and n represents a whole integer of from about 1 to 22.

An alkylamphoacetate or propionate as used in the invention, such as coco or tallow, at alkaline pH is an anionic surfactant as represented below:

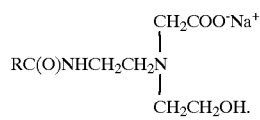

At acid pH, the carboxylate group ionization is suppressed, the amine group is protonated by the excess hydrogen ions and the result is a cationic material:

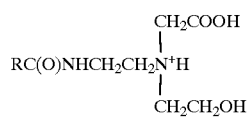

In the isoelectric range both sites are ionized and a zwitterion is formed:

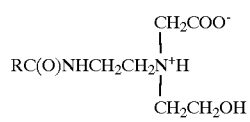

In similar manner, the compounds of Formula III likewise are capable of different ionic forms depending on pH as illustrated by the following preferred compounds:

Alkyloamphodicarboxylates (e.g., diacetates and dipropionates)

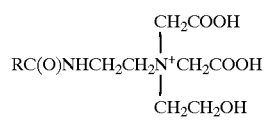

Acid pH-Cationic

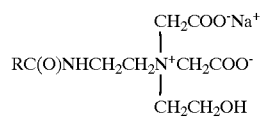

Alkaline pH-Anionic

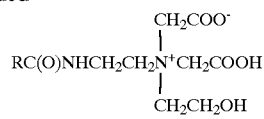

Neutral pH-Zwitterionic

The inclusion of the various ionic possibilities of compounds in Formulae II and III includes the sulfonated derivatives as well as the carboxylated derivatives.

Included within Formula II of the invention are the amino and imino carboxylates which are well known and also vary ionic form depending on pH.

Alkylaminopropionates $RNH_2^+CH_2CH_2COOH$
Acid pH Cationic
$RNH_2^+CH_2CH_2COO$
Neutral pH-Zwitterionic
$RNHCH_2CH_2COO^-Na^+$
Alkaline pH-Anionic Alkyliminodipropionates

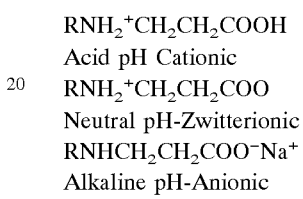

Acid pH
Cationic

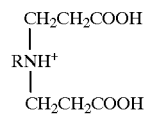

Neutral pH
Zwitterionic

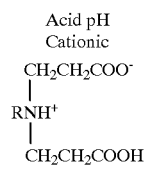

Alakaline pH
Anionic

The above compounds differ from the imidazoline derived materials since they have no amide group and the betaines since the nitrogen is not quaternized. These ionic variations are intended to be included within the formulae defining the compounds useful in this invention.

The surfactant-containing solutions of the invention can contain in, addition to the surfactants described hereinbefore, other materials such as silicates, phosphates, pyrophosphates and polyphosphates, for example, in the form of the sodium salts. Other additives that may be present include lower alcohols of 1–6 carbons, glycols, glycol ethers, chelating agents, thickeners such as amides, cellulose derivatives, builders such as phosphates and sequestering agents/buffers and polyacrylates. In some cases, additional anionic, nonionic or cationic surface active agents including corrosion inhibitors and hydrotropes can also be present. Agents to reduce foaming can also be present. Alternate surfactants can be illustrated by alkyl sulfates, alkyl sulfonates, phosphate esters, alkyl carboxylates, nonylphenol ethoxylates, alcohol ethoxylates, ethoxylated fatty acid amides and alkyl quaternary ammonium compounds.

Typically, aqueous surfactant-containing solutions utilized in accordance with the invention can contain surfactants in amounts ranging from 0.1 to 40, and preferably from about 0.1 to 10, active percent by weight of the solution. Concentrated solutions, generally designed for dilution can contain higher percentages, such as up to about 40% active weight percent of surfactants.

The solutions of the present invention can be filtered, preferably using a polymeric, ceramic or metal/metal oxide sintered filter on a ceramic backing. For example, an ultrafiltration membrane system can include a feed tank and a separation membrane unit that is composed of a metal oxide membrane, e.g., titanium or zirconium oxide, optionally, with a yttrium oxide stabilizer, on a ceramic carrier, e.g., alpha-alumina with or without titanium dioxide having 1 or more channels on a monolithic support. The flux can be maintained at acceptable levels to allow soils to be concentrated in the retentate with minimal fouling through extended operating times while passing the surfactant-containing solution through the filter to be recovered in the permeate for recycling and reuse. While an effective pore size is easily determinable by a skilled artisan, nominal pore sizes of less than about 1,000 Angstroms and preferably less than about 500 Angstroms can be used. Rate of filtering can vary depending on filter pore size, pressure, temperature and the like.

As used herein, the term "contaminants" may include, either singly or in mixtures, oils used in metal stamping, forming, bending, grinding, drilling, machining, and polishing; low to medium molecular weight hydrocarbons; paraffinic soils; waxes; petrolatum; non-chlorinated high viscosity hydrocarbons; chlorinated and sulfurized hydrocarbons; mineral oils; and vegetable oils. Also included in this term are materials which are partially soluble in the aqueous solution or which form stable micro-emulsions in water such as polyethylene and polypropylene glycol, oil-surfactant blends, water-soluble cutting fluids, machining coolants, unsaturated mono-, di-, and triglycerides, animal fats, fatty acids, and esters. Included in the term "contaminants" are insoluble solids such as extremely fine structural material particulate; inorganic, inert, or elemental solid particulate; and metal oxide particulate not dissolved by the particular surfactant-containing aqueous solution.

The present invention will be further illustrated in the example which follows:

EXAMPLE I

Filterable surfactants were evaluated against a commercially available composition by comparing the concentration of surfactant in solution at pH 12 before and after passing through an ultrafiltration membrane filter, KERASEP (sold by Tech Sep). Two gallons of surfactant solution of an activity as stated in the tables was prepared and charged into the working tank of the filtration unit. The working tank solution was heated and maintained at 52±2° C during the operation. The working tank solution was circulated through the membrane. The inlet pressure was adjusted to 20 psi. The retentate and permeate were looped back to the working tank so that the concentration of working tank solution was constant all the time. Sample solutions were collected from the permeate and working tank at set time intervals. The percentage of surfactants permeated was expressed as the ratio of permeate concentration to working tank concentration. The surfactant concentrations were determined by surface tension measurement techniques. The values obtained will vary as a function of different operating conditions.

TABLE 1

PERCENTAGE OF SURFACTANT I PASSING THROUGH THE MEMBRANE
[Initial conc. (Ci) = 0.25% active, 0.1 um pore size]

| Min | Concentrate of Permeate K(CP) (wt% active) | Cp/Ci (%) (wt % active) |
|---|---|---|
| 5 | 0.170 | 68.6 |
| 30 | 0.178 | 71.2 |
| 60 | 0.161 | 64.0 |
| 120 | 0.156 | 62.4 |
| 240 | 0.118 | 47.2 |

SURFACTANT I is $C_8$ alkyl N,N Dimethyl Betaine

TABLE 2

PERCENTAGE OF SURFACTANT II PASSING THROUGH THE MEMBRANE
[Initial conc. (Ci) = 6.97% active, pH = 12, 0.1 um pore size]

| Min | Concentrate of Permeate (CP) (wt % active) | Cp/Ci (%) (wt % active) |
|---|---|---|
| 5 | 5.687 | 81.5 |
| 60 | 5.193 | 74.5 |
| 120 | 4.582 | 65.7 |
| 240 | 4.892 | 70.1 |

SURFACTANT II is a blend of a capryloamphodiacetate and a $C_8$ alkylaminopropionate.

TABLE 3

PERCENTAGE OF SURFACTANT III PASSING THROUGH THE MEMBRANE
[Initial conc. (Ci) = 5.7% active, pH = 12, 0.1 um pore size]

| Min | Concentrate of Permeate (CP) (wt % active) | Cp/Ci (%) (wt % active) |
|---|---|---|
| 5 | 5.127 | 90.1 |
| 30 | 5.522 | 97.0 |
| 60 | 5.687 | 99.9 |
| 120 | 5.189 | 91.2 |
| 240 | 4.989 | 87.7 |

SURFACTANT III is a $C_8$ alkylaminopropionate.

TABLE 4

PERCENTAGE OF SURFACTANT IV PASSING THROUGH THE MEMBRANE
[Initial conc. (Ci) = 5.5% active, pH = 9, 0.1 um pore size)

| Min | Concentrate of Permeate (CP) (wt % active) | Cp/Ci (%) (wt % active) |
|---|---|---|
| 5 | 4.901 | 89.1 |
| 30 | 4.850 | 88.1 |
| 60 | 4.721 | 85.2 |
| 120 | 4.701 | 85.6 |
| 240 | 4.621 | 83.8 |

Surfactant IV is a dimethyloctylamine oxide (Structure III)

TABLE 5

PERCENTAGE OF BRULIN 63G PASSING THROUGH THE MEMBRANE
[Initial conc. (Ci) = 3% Brulin 63G, pH = 'as is' active, 0.1 um pore size]

| Min | Concentrate of Permeate (CP) (wt % active) | Cp/Ci (%) (wt % active) |
|---|---|---|
| 5 | 0.316 | 10.5 |
| 30 | 0.309 | 10.3 |
| 60 | 0.302 | 10.1 |
| 120 | 0.288 | 9.6 |
| 240 | 0.251 | 8.4 |

As it can be seen from the data in Tables 1, 2, 3, and 4 a large proportion, generally between about 65% and as high as about 99% of the surfactant compositions of the invention, passes through the ultrafiltration membrane and is captured in the permeate. The data in Tables 1, 2, 3, and 4 demonstrate that the permeate of an aqueous surfactant-containing solution containing a surfactant of the invention can be effectively recycled for reuse. This high recovery of the surfactant also reduces the pressure on the environment that would otherwise occur without surfactant recovery.

In contrast, the data in Table 5 shows that only a small amount of surfactant from a commercially available aqueous surfactant-containing solution passes through the ultrafiltration membrane and becomes part of the permeate. The working solution was prepared as before using a sufficient amount of the commercial solution to provide an initial concentration (calculated) of about 3% with an "as is" pH. The commercial product (identified as Brulin 63G) is thought to contain a blend of sodium xylene sulfonate, potassium phosphate, sodium silicate and two nonionic surfactants (mol. wt. about 2750 and about 910 respectively) having an alcoholic portion of about $C_{10}$ and about 50 moles of EO/PO (about 32 mol. EO/18 mol. PO randomly distributed). Upon comparing the data in Table 5, it can be seen that most of the surfactant remains in the working tank and less than 10.5% passes through the ultrafilter to be retained in the permeate.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for recovering surfactants from an aqueous surfactant-containing solution wherein the solution is ultrafiltered to recover the surfactant formulation from the permeate recycle and reuse, which comprises using an effective amount of a surfactant consisting essentially of a betaine or amine oxide amphoteric surfactant.

2. A process as recited in claim 1, wherein said aqueous solution comprises from about 0.1 to about 40 active percent by weight of said surfactant.

3. A process as recited in claim 1, wherein said aqueous solution comprises from about to about 10 active percent by weight of said surfactant.

4. A process for recovering at least 65% of one or more highly pure surfactants from an aqueous surfactant-containing solution wherein the solution is ultrafiltered to recover the surfactant formulation from the permeate for recycle and reuse, which comprises using as a surfactant for said solution which is ultrafiltered a surface active effective amount of one or more surfactants of the formula:

I.

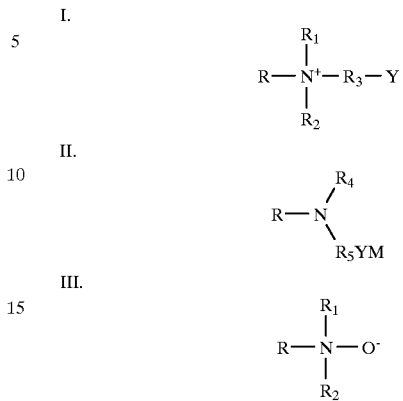

II.

III.

and mixtures thereof and mixtures with other surfactants wherein R is selected from the group of alkyl, alkylarylalkyl, arylalkyl, alkylaminoalkyl, alkylamidoalkyl, or alkoxylalkyl wherein the alkyl group contains from about 1 to about 22 carbon atoms, the aryl group is up to and including two fused rings and the alkoxy group contains from 4 to 18 carbon atoms wherein the total carbon atom content of the R group is no more than about 22 carbon atoms.

$R_1$ and $R_2$ independently represent alkyl of from about 1 to about 6 carbon atoms and the hydroxy substituted derivatives thereof or hydroxy polyoxyethylene, polyoxypropylene or mixed polyether polymers of EO and PO having no more than 20 ether linkages; or $R_1$ and $R_2$ may jointly be —$CH_2CH_2OCH_2CH_2$— or —$CH_2CH_2SCH_2CH_2$— so as to form together with the nitrogen atom a morpholine or thiomorpholine ring; $R_3$ represents an alkyl or hydroxy substituted alkyl group of from 1 to about 4 carbon atoms; $R_4$ represents $R_6OH$, $R_5YM$, or hydrogen; $R_5$ and $R_6$ independently represent alkyl or hydroxy-substituted alkyl of from 1 to about 4 carbon atoms; with the additional caveat that $R_5YM$ can be:

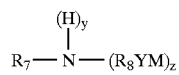

wherein $R_7$ and $R_8$ independently represent a $C_1$–$C_4$ alkyl and y is 0 or 1 and Z is 1 or 2; with the stipulation that y+z equals 2; Y represents $COO^-$ and M represents hydrogen and or an alkali metal.

5. A process as recited in claim 4, wherein R is alkyl, alkoxyalkyl, alkylaminoalkyl and alkylamidoalkyl.

6. A process as recited in claim 5, wherein the alkyl or alkoxy group contains from about 4 to 10 carbon atoms.

7. A process recited in claim 6, wherein R is alkoxyalkyl.

8. A process as recited in claim 7, wherein $R_1$ and $R_2$ are methyl.

9. A process as recited in claim 8, wherein $R_4$ is R6OH.

10. A process as recited in claim 8, wherein $R_4$ is $R_5$COOM.

11. A process as recited in claim 8, wherein $R_4$ is hydrogen.

12. A process for recovering surfactants from an aqueous surfactant/contaminant containing solution where the solution is ultrafiltered to separate and recover the surfactant from the permeate for recycle and reuse, which comprises using as the surfactant a surface active effective amount of a surfactant of the formula:

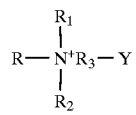

and mixtures thereof and mixtures with other surfactants wherein R is selected from the group of alkyl, alkylarylalkyl, arylalkyl, alkylaminoalkyl, alkylamidoalkyl, or alkoxylalkyl and the hydroxy-substituted derivatives thereof wherein the alkyl group contains from about 1 to about 18 carbon atoms, the aryl group is up to and including two fused rings and the alkoxy group contains from 4 to 18 carbon atoms wherein the total carbon atom content of the R group is no more than about 22 carbon atoms and;

$R_1$ and $R_2$ independently represent alkyl of from about 1 to about 6 carbon atoms and the hydroxy substituted derivatives thereof or hydroxy polyoxyethylene, poly-oxypropylene or mixed polyether polymers of EO and P0 having no more than 20 ether linkages; or $R_1$ and $R_2$ may jointly be $-CH_2CH_2OCH_2CH_2-$ or $-CH_2CH_2SCH_2CH_2-$ so as to form together with the nitrogen atom a morpholine or thiomorpholine ring; $R_3$ represents an alkyl or hydroxy substituted alkyl group of from 1 to about 4 carbon atoms; and Y represents $COO^-$.

13. A process as recited in claim 12, wherein $R_1$ and $R_2$ are methyl.

14. A process as recited in claim 13, wherein R is $C_4$ to about $C_{10}$ alkyl, alkylamidoalkyl, or alkoxyalkyl.

15. A process as recited in claim 12, wherein $R_1$ and $R_2$ are other than methyl and are substituted with an electron withdrawing group.

16. A process as recited in claim 13, wherein R is alkoxyalkyl wherein the alkyl portion has 3 carbon atoms, and $R_3$ is hydroxypropyl.

17. A process for recovering surfactants from an aqueous surfactant/contaminant containing solution where the solution is ultrafiltered to separate and recover the surfactant from the permeate for recycle and reuse, which comprises using as the surfactant for said solution which is ultrafiltered a surface active effective amount of a surfactant of the formula:

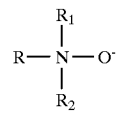

and mixtures thereof and mixtures with other surfactants wherein R is selected from the group of alkyl, alkylarylalkyl, arylalkyl, alkylaminoalkyl, alkylamidoalkyl, or alkoxylalkyl and the hydroxy-substituted derivatives thereof wherein the alkyl group contains from about 1 to about 18 carbon atoms, the aryl group is up to and including two fused rings and the alkoxy group contains from 4 to 18 carbon atoms wherein the total carbon atom content of the R group is no more than about 22 carbon atoms; $R_4$ represents $R_6OH$, $R_5YM$ or hydrogen; $R_5$ and $R_6$ independently represent alkyl or hydroxy substituted alkyl of from 1 to about 4 carbon atoms with the further caveat that $R_5$ YM can be:

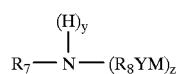

wherein $R_7$ and $R_8$ independently represent a $C_1$ to $C_4$ alkyl and y is 0 or 1 and z is 1 or 2 with the stipulation tht y+z equals 2; Y represents $-COO^-$, and M represents hydrogen and or an alkali metal selected from the group comprising sodium, potassium, calcium, lithium and mixtures thereof.

18. A process as recited in claim 17, wherein R is alkoxyalkyl.

19. A process as recited in claim 18, wherein $R_4$ is $R_6OH$.

20. A process as recited in claim 18, wherein $R_4$ is $R_5COOM$.

21. A process as recited in claim 18, wherein $R_4$ is hydrogen.

22. A process for recovering surfactants from an aqueous surfactant/contaminant containing solution where the solution is ultrafiltered to separate and recover the surfactant from the permeate for recycle and reuse, a surface active effective amount of a surfactant of the formula:

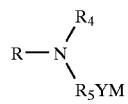

and mixtures thereof and mixtures with other surfactants wherein R is selected from the group of alkyl, alkylarylalkyl, arylalkyl, alkylaminoalkyl, and the sulfonated derivatives thereof, alkylamidoalkyl, or alkoxylalkyl wherein the alkyl group contains from about 1 to about 18 carbon atoms, the aryl group is up to and including two fused rings and the alkoxy group contains from 4 to 18 carbon atoms wherein the total carbon atom content of the R group is no more than about 22 carbon atoms;

23. A process as recited in claim 22, wherein R is alkyl, alkoxyalkyl, alkylaminoalkyl or alkylamidoalkyl.

24. A process as recited in claim 23, wherein R is alkylamidoalkyl.

25. A process as recited in claim 24, wherein R is $C_2$ to $C_{20}$ alkylamidoethyl.

26. A process a recited in claim 25 wherein said aqueous solution comprises from about 0.1 about 10 active percent by weight of said surfactant.

27. A process as recited in claim 26, wherein said aqueous solution is ultrafiltered using an ultrafiltration membrane which is a polymer, metal oxide or a sintered metal oxide on a ceramic support.

28. A process as recited in claim 22, wherein R is alkyl, alkoxyalkyl, alkylaminoalkyl and alkylamidoalkyl and the alkyl or alkoxy group contains from about 2 to 20 carbon atoms.

29. The process of claim 1 wherein said surfactant is selected from the group comprising compounds represented by the formula:

a)

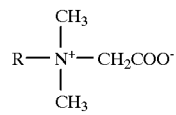

-continued b) 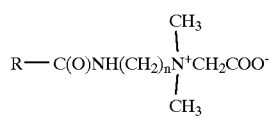

c) 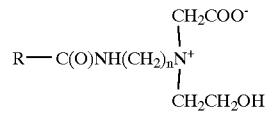

d) 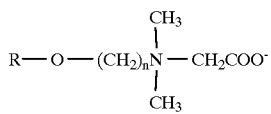

e) 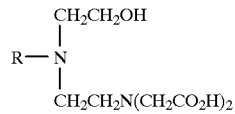

f) 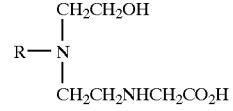

wherein R represents a linear or branched alkyl, alkylene, aryl, alkylaryl, amidoalkyl, alkylamidoalkyl, alkoxyalkyl, alkoxy and n is an integer of from 2 to 20 inclusive.

30. The process of claim 1 wherein said surfactant is selected from the group of compounds represented by the formula:

g) 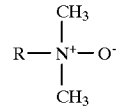

h) 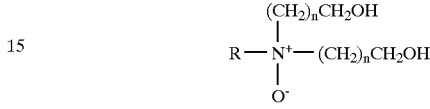

i) 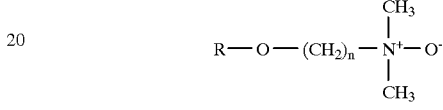

wherein R has been hereinbefore defined and n is a whole number of from 2 to 20 inclusive.

31. The process of claim 1 wherein said surfactant is selected from the group consisting essentially of alkylamphodiproprionates.

* * * * *